US012682890B2

(12) United States Patent     (10) Patent No.:   US 12,682,890 B2

Rosenberg et al.     (45) Date of Patent:     Jul. 14, 2026

(54) MASK-CONFORMER AUGMENTING CONFORMER WITH MASK-PREDICT DECODER UNIFYING SPEECH RECOGNITION AND RESCORING

(71) Applicant: Google LLC, Mountain View, CA (US)

(72) Inventors: Andrew M. Rosenberg, Brooklyn, NY (US); Yosuke Higuchi, Mountain View, CA (US); Bhuvana Ramabhadran, Mt. Kisco, NY (US)

(73) Assignee: Google LLC, Mountain View, CA (US)

( * ) Notice: Subject to any disclaimer, the term of this patent is extended or adjusted under 35 U.S.C. 154(b) by 193 days.

(21) Appl. No.: 18/589,802

(22) Filed: Feb. 28, 2024

(65) Prior Publication Data

US 2024/0296837 A1     Sep. 5, 2024

Related U.S. Application Data

(60) Provisional application No. 63/487,861, filed on Mar. 1, 2023.

(51) Int. Cl.
*G10L 15/16*     (2006.01)
*G10L 15/22*     (2006.01)

(52) U.S. Cl.
CPC .............. *G10L 15/16* (2013.01); *G10L 15/22* (2013.01)

(58) Field of Classification Search
CPC ................................ G10L 15/16; G10L 15/22
See application file for complete search history.

(56) References Cited

U.S. PATENT DOCUMENTS

| | | | | |
|---|---|---|---|---|
| 2021/0056975 A1* | 2/2021 | Peng | ........................ | G10L 17/04 |
| 2023/0090590 A1* | 3/2023 | Fu | ......................... | G10L 15/187 |
| | | | | 704/231 |
| 2023/0169281 A1* | 6/2023 | Zheng | ..................... | G10L 15/28 |
| | | | | 704/2 |

FOREIGN PATENT DOCUMENTS

| | | | | | |
|---|---|---|---|---|---|
| CN | 112767926 A | * | 5/2021 | ............. | G10L 15/32 |
| CN | 114023316 A | * | 2/2022 | ............. | G10L 15/16 |

OTHER PUBLICATIONS

David Qiu et al, "Learning Word-Level Confidence For Subword End-to-End ASR", arxiv.org, Cornell University Library, 201 Olin Library Cornell University Ithaca, NY 14853, Mar. 11, 2021 (Mar. 11, 2021), XP081909812.

(Continued)

*Primary Examiner* — Andrew C Flanders
*Assistant Examiner* — Shashidhar Shankar Manoharan
(74) *Attorney, Agent, or Firm* — Honigman LLP; Brett A. Krueger; Grant Griffith

(57) ABSTRACT

A method includes receiving a sequence of acoustic frames characterizing an utterance. During a first pass, the method includes generating first-pass audio encodings based on the sequence of acoustic frames using a stack of mask-conformer blocks of an acoustic encoder, generating a first-pass transcription of the utterance based on the first-pass audio encodings using a speech recognition decoder, and generating a first-pass masked output sequence using a mask-predict decoder of the acoustic encoder. During a second pass, the method includes generating second-pass audio encodings by performing cross-attention on the sequence of acoustic frames and the masked first-pass transcription using the stack of mask-conformer blocks of the acoustic encoder and generating a second-pass transcription of the utterance based on the second-pass audio encodings using the speech recognition decoder.

18 Claims, 7 Drawing Sheets

(56)                 References Cited

OTHER PUBLICATIONS

Hirofumi Inaguma et al, "UnitY: Two-pass Direct Speech-to-speech Translation with Discrete Units", arxiv.org, Cornell University Library, 201 Olin Library Cornell University Ithaca, NY 14853, Dec. 15, 2022 (Dec. 15, 2022), XP091394858.
International Search Report and Written Opinion issued in related PCT Application No. PCT/US2024/017644, dated May 24, 2024.

* cited by examiner

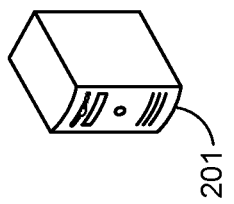
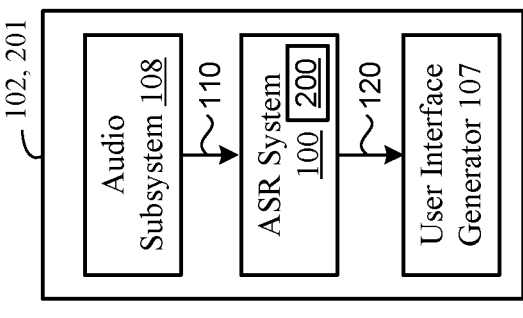
102, 201
Audio Subsystem 108
110
ASR System 100 200
120
User Interface Generator 107
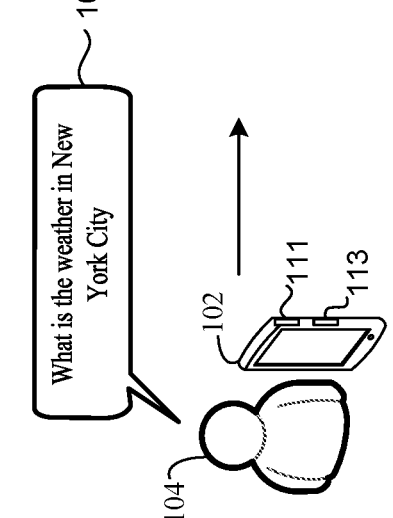
106
What is the weather in New York City
102
111
113
104
FIG. 1

301

400

Algorithm Decoding algorithm of Mask-Conformer

Input: Input sequence $O$; Beam size $K$; Threshold prob. $P_{\text{thres}}$ 402    $H_{\text{cfm}} = \text{Conformer}(O)$ 404    $\hat{W} = \text{DecodeTransducer}(H_{\text{cfm}}, K)$ 406    for $\hat{w}_n \in \hat{W}$ do

$$\tilde{w}_n = \begin{cases} \texttt{[MASK]}, & \text{if } p(\hat{w}_n | \hat{W}, H_{\text{cfm}}) \leq P_{\text{thres}} \\ \hat{w}_n, & \text{otherwise} \end{cases}$$

408    $H_{\text{cfm-ca}} = \text{MaskConformer}(O, \tilde{W})$

410    $\hat{\hat{W}} = \text{DecodeTransducer}(H_{\text{cfm-ca}}, K)$

FIG. 4

MASK-CONFORMER AUGMENTING CONFORMER WITH MASK-PREDICT DECODER UNIFYING SPEECH RECOGNITION AND RESCORING

CROSS REFERENCE TO RELATED APPLICATIONS

This U.S. patent application claims priority under 35 U.S.C. § 119(e) to U.S. Provisional Application No. 63/487,861, filed on Mar. 1, 2023. The disclosure of this prior application is considered part of the disclosure of this application and is hereby incorporated by reference in its entirety.

TECHNICAL FIELD

This disclosure relates to augmenting a conformer with mask-predict decoder unifying speech recognition and rescoring.

BACKGROUND

Speech recognition aims to transcribe a speech input into a corresponding text output. Much of the recent progress in speech recognition has focused on developing an acoustic encoder of the speech recognition model. The acoustic encoder extracts fine-grained phonetic information from the speech input that is sent to a decoder of the speech recognition model. Particularly, the recent progress of the acoustic encoder includes enlarging a capacity for pre-training the acoustic encoder and designing an architecture suitable for speech. Due to the significant performance increases of the audio encoder, the decoder of the speech recognition model has become less influential as a language model that learns output dependencies at a token level. As such, little to no advancements in learning output dependencies at the token level have been made for speech recognition models.

SUMMARY

One aspect of the disclosure provides a computer-implemented method that when executed on data processing hardware causes the data processing hardware to perform operations for augmenting a conformer with a mask-predict decoder to unify speech recognition and rescoring. The operations include receiving a sequence of acoustic frames characterizing an utterance. During a first pass, the operations include: generating first-pass audio encodings based on the sequence of acoustic frames using a stack of mask-conformer blocks of an acoustic encoder; generating a first-pass transcription of the utterance that includes a sequence of speech recognition tokens based on the first-pass audio encodings using a speech recognition decoder, and generating a first-pass masked output sequence using a mask-predict decoder of the acoustic encoder. Here, the first-pass transcription includes a sequence of speech recognition tokens whereby generating the first-pass masked output sequence by masking one or more of the speech recognition tokens from the sequence of speech recognition tokens with a masked token. During a second pass, the operations include generating second-pass audio encodings by performing cross-attention on the sequence of acoustic frames and the first-pass masked output sequence using the stack of mask-conformer blocks of the acoustic encoder and generating a second-pass transcription of the utterance based on the second-pass audio encodings using the speech recognition decoder.

Implementations of the disclosure may include one or more of the following optional features. In some implementations, the operations further include generating a convolution output based on the sequence of acoustic frames using one or more convolution subsampling layers. Here, generating the first-pass audio encodings is further based on the convolution output. The speech recognition decoder may include one of a Connectionist Temporal Classification (CTC) decoder, a listen-attend-spell decoder, a Recurrent Neural Network-Transducer (RNN-T) decoder, a hybrid autoregressive transducer (HAT) decoder, a Globally Normalized Autoregressive Transducer (GNAT) decoder, or a mask-predict decoder. In some examples, the decoder is connected to an output of each mask-conformer block in the stack of mask-conformer blocks.

In some implementations, each mask-conformer block in the stack of mask-conformer blocks includes at least one of a stack of self-attention layers, a cross-attention layer, a convolution layer, or a mask-predict decoder. In these implementations, the cross-attention layer is disabled during the first pass and the cross-attention layer is enabled during the second pass. In some examples, each mask-conformer block in the stack of mask-conformer blocks includes a respective mask-predict decoder not shared with any of the other mask-conformer blocks in the stack of mask-conformer blocks. In other examples, each mask-conformer block in the stack of mask-conformer blocks includes a same mask-predict decoder shared with each other mask-conformer block in the stack of mask-conformer blocks. Generating the first-pass masked output sequence includes, for each respective speech recognition token from the sequence of speech recognition tokens, determining a confidence value indicating a likelihood that the respective speech recognition token is correct. Here, the operations further include determining that the confidence value for a respective one of the speech recognition tokens satisfies a confidence value threshold and replacing the respective one of the speech recognition tokens with the masked token based on determining that the confidence value for the respective one of the speech recognition tokens satisfies the confidence value threshold.

Another aspect of the disclosure provides a system that includes data processing hardware and memory hardware storing instructions that when executed on the data processing hardware causes the data processing hardware to perform operations. The operations include receiving a sequence of acoustic frames characterizing an utterance. During a first pass, the operations include: generating first-pass audio encodings based on the sequence of acoustic frames using a stack of mask-conformer blocks of an acoustic encoder; generating a first-pass transcription of the utterance that includes a sequence of speech recognition tokens based on the first-pass audio encodings using a speech recognition decoder, and generating a first-pass masked output sequence using a mask-predict decoder of the acoustic encoder. Here, the first-pass transcription includes a sequence of speech recognition tokens whereby generating the first-pass masked output sequence by masking one or more of the speech recognition tokens from the sequence of speech recognition tokens with a masked token. During a second pass, the operations include generating second-pass audio encodings by performing cross-attention on the sequence of acoustic frames and the first-pass masked output sequence using the stack of mask-conformer blocks of the acoustic encoder and generating a second-pass transcription of the utterance based on the second-pass audio encodings using the speech recognition decoder.

Implementations of the disclosure may include one or more of the following optional features. In some implementations, the operations further include generating a convolution output based on the sequence of acoustic frames using one or more convolution subsampling layers. Here, generating the first-pass audio encodings is further based on the convolution output. The speech recognition decoder may include one of a Connectionist Temporal Classification (CTC) decoder, a listen-attend-spell decoder, a Recurrent Neural Network-Transducer (RNN-T) decoder, a hybrid autoregressive transducer (HAT) decoder, a Globally Normalized Autoregressive Transducer (GNAT) decoder, or a mask-predict decoder. In some examples, the decoder is connected to an output of each mask-conformer block in the stack of mask-conformer blocks.

In some implementations, each mask-conformer block in the stack of mask-conformer blocks includes at least one of a stack of self-attention layers, a cross-attention layer, a convolution layer, or a mask-predict decoder. In these implementations, the cross-attention layer is disabled during the first pass and the cross-attention layer is enabled during the second pass. In some examples, each mask-conformer block in the stack of mask-conformer blocks includes a respective mask-predict decoder not shared with any of the other mask-conformer blocks in the stack of mask-conformer blocks. In other examples, each mask-conformer block in the stack of mask-conformer blocks includes a same mask-predict decoder shared with each other mask-conformer block in the stack of mask-conformer blocks. Generating the first-pass masked output sequence includes, for each respective speech recognition token from the sequence of speech recognition tokens, determining a confidence value indicating a likelihood that the respective speech recognition token is correct. Here, the operations further include determining that the confidence value for a respective one of the speech recognition tokens satisfies a confidence value threshold and replacing the respective one of the speech recognition tokens with the masked token based on determining that the confidence value for the respective one of the speech recognition tokens satisfies the confidence value threshold.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a schematic view of an example speech recognition system.

FIG. 4 illustrates an example two-pass process of performing speech recognition.

Like reference symbols in the various drawings indicate like elements.

DETAILED DESCRIPTION

Figure 2:
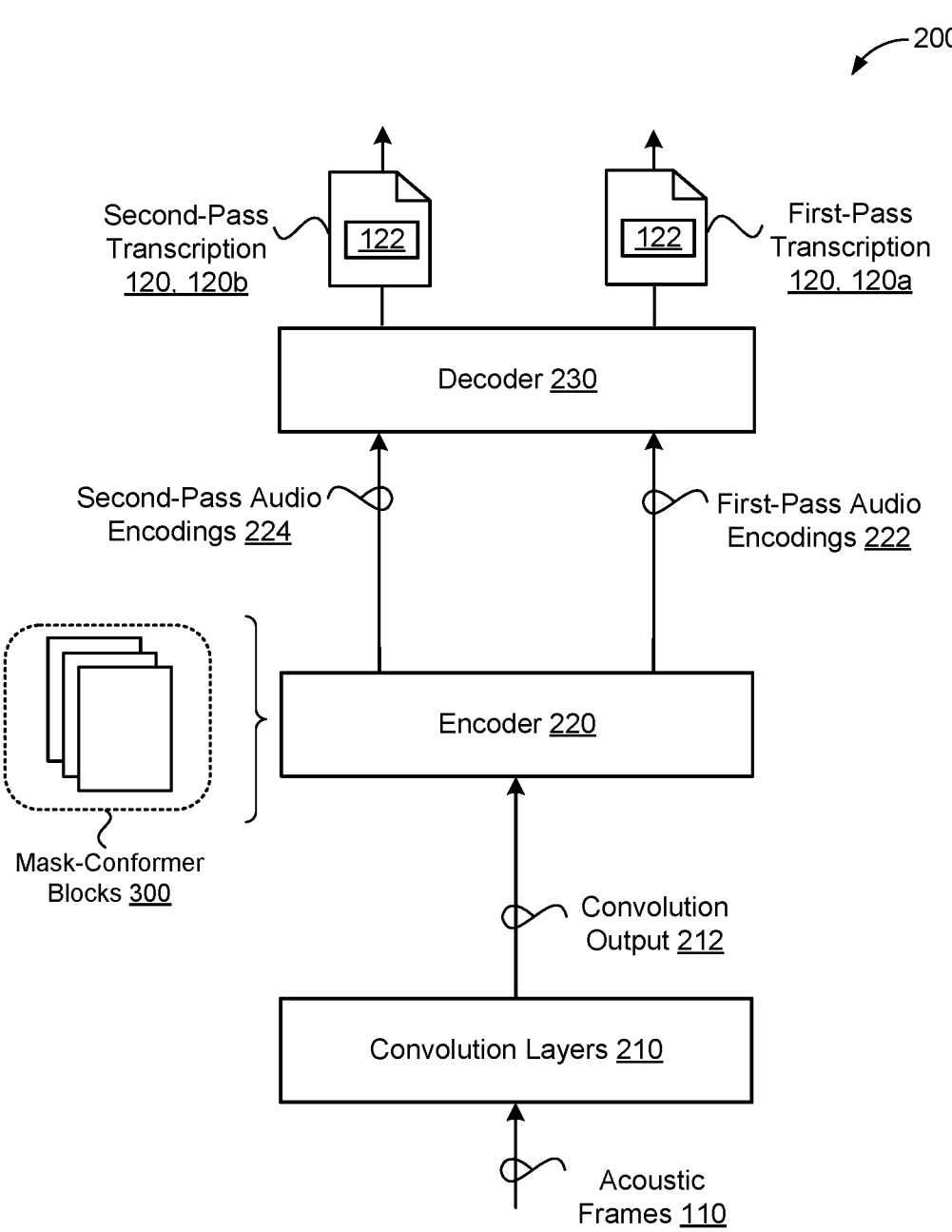
FIG. 2 is a schematic view of an example speech recognition model.

End-to-end (E2E) automatic speech recognition (ASR) models convert speech into text using deep neural networks. In some examples, E2E ASR models use attention-based sequence-to-sequence and transducer models that include encoder and decoder networks. The encoder network is analogous to an acoustic model that extracts fine-grained phonetic patterns from input acoustic signals. In contrast, the decoder network operates as a language model (LM) that captures long-range dependencies from textual output labels (e.g., graphemes, subwords, words, etc.). Thus, by combining the encoder and the decoder networks, the E2E ASR models are able to successfully perform direct sequence conversion between different modalities.

Much of the recent progress of E2E ASR models focus on improving the quality of the encoder. For instance, some approaches include enlarging the capacity of the encoder for pre-training and designing an architecture of the encoder suitable for speech. With the significant progress of the encoder, the capacity of the decoder, in contrast, has become less influential in improving ASR performance. For example, some conformer-based ASR models use a decoder network that only adopts a single long short-term memory layer (LSTM). In other examples, the structure of the decoder network is further simplified to a bi-gram or even a randomly initialized embedding layer without sacrificing speech recognition accuracy.

Implementations herein are directed towards methods and systems of performing speech recognition with a speech recognition model that has a stack of mask-conformer blocks. More specifically, the method includes receiving a sequence of acoustic frames characterizing an utterance and performing a first pass and a second pass of speech recognition. During the first pass, the method includes generating fist-pass audio encoding based on the sequence of acoustic frames using a stack of mask-conformer blocks, generating a first-pass transcription based on the first-pass audio encodings using a speech recognition decoder, and generating a first-pass masked output sequence using a mask-predict decoder of the acoustic encoder. During the second pass, the method includes generating second pass encodings by performing cross-attention on the sequence of acoustic frames and the first-pass masked output sequence using the stack of mask-conformer blocks and generating a second-pass transcription 120b of the utterance based on second-pass audio encodings using the speech recognition decoder. Advantageously, since the mask-predict decoder is integrated into the acoustic encoder of a speech recognition model, lexical information is back-propagated into the acoustic encoder in addition to, or in lieu of, injecting the lexical information into the speech recognition decoder.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IOT) device, and is equipped with data processing hardware 111 and memory hardware.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

FIG. 2 shows an example ASR model 200 that includes one or more convolution subsampling layers 210, an acoustic encoder 220, and a speech recognition decoder 230. In some examples, the one or more convolution subsampling layers 210 are separate from the acoustic encoder 220. In other examples, the one or more convolution subsampling layers 210 are part of the acoustic encoder 220 (not shown). The convolution subsampling layers 210 are configured to receive, as input, audio features (i.e., sequence of acoustic frames) 110 characterizing an utterance 106 (FIG. 1) and generate, as output, a convolution output 212 based on the sequence of acoustic frames 110. The acoustic encoder 220 is configured to receive, as input, the convolution output 212 generated by the one or more convolution subsampling layers 210 and generate, as output, audio encodings 222, 224 based on the convolution output 212. More specifically, the acoustic encoder 220 includes a stack of mask-conformer blocks 300 that receives the convolution output 212 and generates the audio encodings 222, 224. Each mask-conformer block is constructed of encoder layers such as conformer encoder layers.

In some implementations, the acoustic encoder 220 receives the sequence of acoustic frames 110 directly in lieu of receiving the convolution output 212. The speech recognition decoder 230 is configured to decode the audio encodings 222, 224 to generate a sequence of speech recognition tokens 122 that form a transcription 120 of the utterance 106.

In some implementations, the output of each mask-conformer block 300 in the stack of mask-conformer blocks 300 is connected to the speech recognition decoder 230. Stated differently, the audio encodings 222, 224 generated by each respective mask-conformer block 300 are sent to the speech recognition decoder 230 such that the speech recognition decoder 230 decodes the audio encodings 222, 224 into a corresponding transcription 120. Moreover, as discussed in greater detail with reference to FIGS. 3A and 3B, each mask-conformer block 300 is configured to receive the transcription 120 generated by the speech recognition decoder 230 based on audio encodings 222, 224 output from an immediately preceding mask-conformer block 300. For example, a first mask-conformer block 300 generates first audio encodings 222, 224 that the speech recognition decoder 230 decodes to generate a corresponding transcription 120 that is sent to a second mask-conformer block 300. In this example, the second mask-conformer block 300 receives the transcription 120 generated by the first mask-conformer block 300.

As will become apparent, the ASR model 200 operates in a two-pass fashion (e.g., streaming and non-streaming fashion) such that the ASR model 200 generates a first-pass transcription 120, 120a and a second-pass transcription 120, 120b. The ASR model 200 generates the second-pass transcription 120b by further processing the first-pass transcription 120a to correct errors (if any) included in the first-pass transcription 120a. To that end, each mask-conformer block 300 of the acoustic encoder 220 generates first-pass audio encodings 222 during a first pass 301 (FIG. 3A) which the speech recognition decoder 230 decodes to generate the first-pass transcription 120a. Thereafter, during a second pass 302 (FIG. 3B), the first-pass transcription 120a is back-propagated to the acoustic encoder 220 whereby each mask-conformer block 300 of the acoustic encoder 220 generates second-pass audio encodings 224 which the speech recognition decoder 230 decodes to generate the second-pass transcription 120b.

The speech recognition decoder 230 may include one of a Connectionist Temporal Classification (CTC) decoder, a listen-attend-spell decoder, a Recurrent Neural Network-Transducer (RNN-T) decoder, a hybrid autoregressive transducer (HAT) decoder, a Globally Normalized Autoregressive Transducer (GNAT) decoder, or a mask-predict decoder. In particular, the RNN-T decoder has a prediction network and a joint network. Here, the prediction network processes a sequence of non-blank output symbols output by a final softmax layer so far into a dense representation. Thereafter, the audio encodings 222, 224 generated by the acoustic encoder 220 and the dense representation produced by the prediction network are combined by the joint network to generate a probability distribution over possible speech recognition hypotheses. The "possible speech recognition hypotheses" correspond to a set of output labels each representing a symbol/character in a specified natural language. Accordingly, the joint network may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. Finally, the softmax layer may employ any technique to select the output label/symbol with the highest probability in the distribution as the next output symbol predicted by the ASR model 200.

Figure 3A:
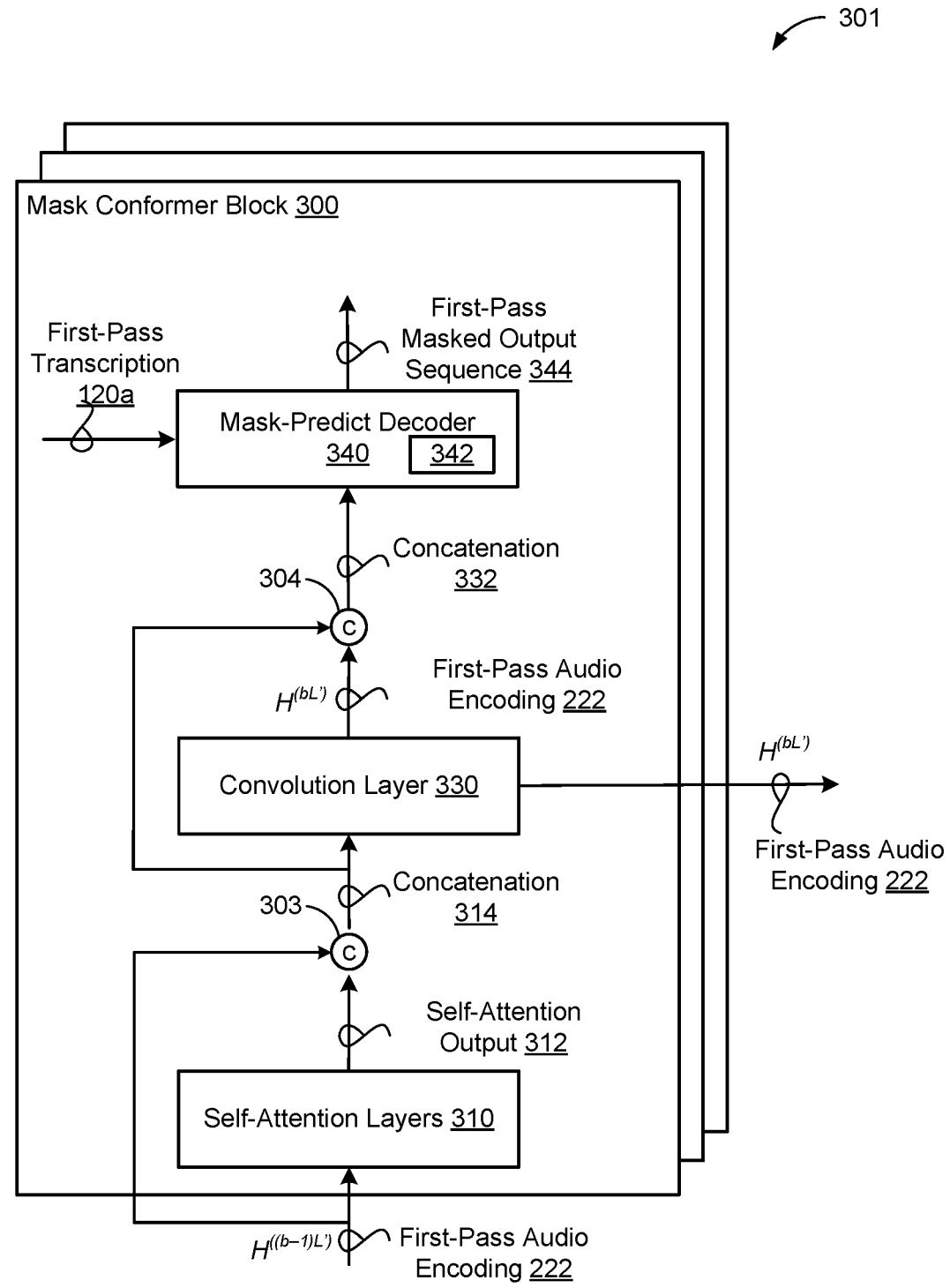
FIG. 3A is a schematic view of an example first pass of performing speech recognition.
Figure 3B:
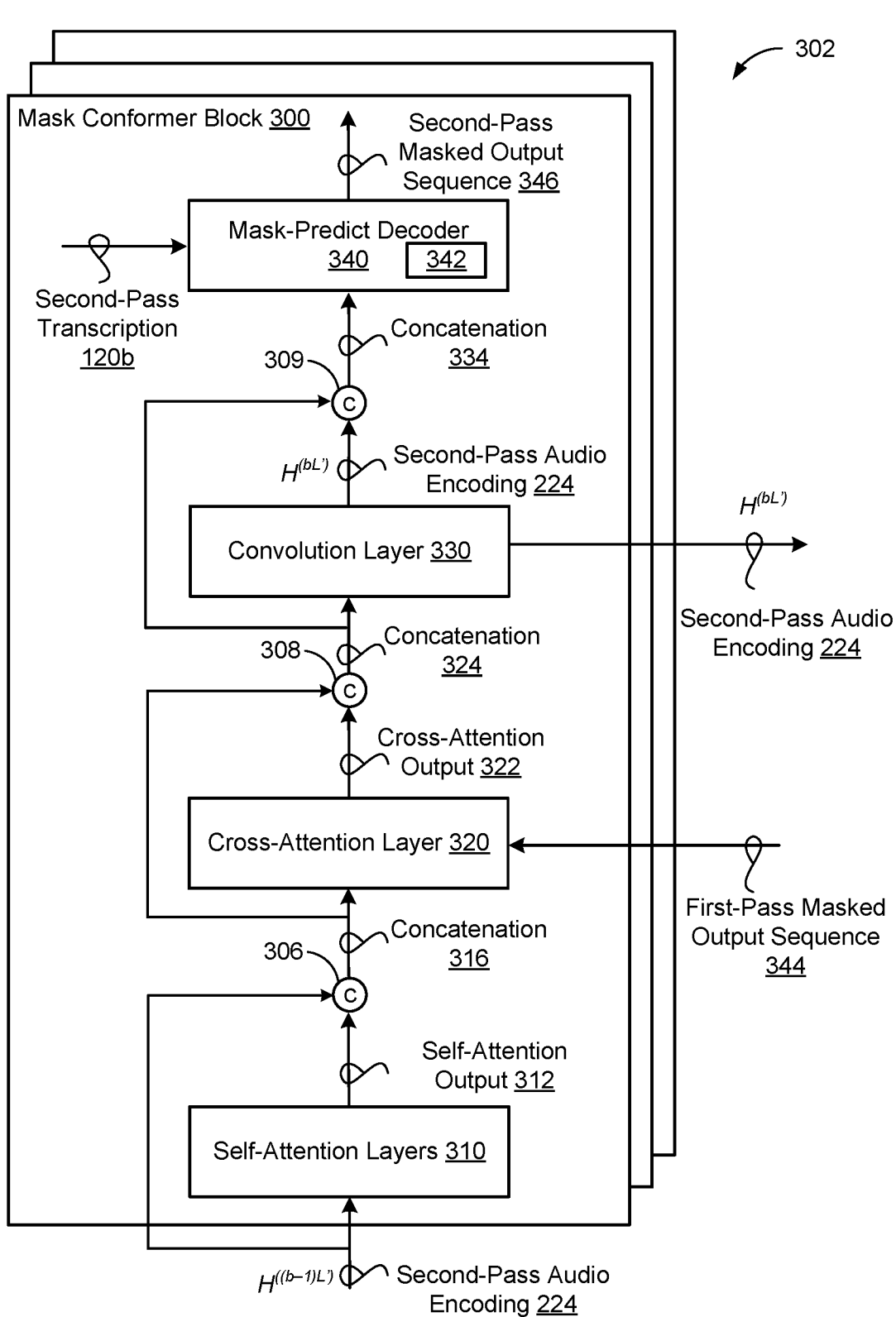
FIG. 3B is a schematic view of an example second pass of performing speech recognition.

FIGS. 3A and 3B show the first pass 301 (FIG. 3A) and the second pass 302 (FIG. 3B) of the stack of mask-conformer blocks 300. Notably, during the first pass 301, there is no available lexical sequence (i.e., first-pass transcription 120a) to condition the stack of mask-conformer blocks 300 on. As such, during the first pass 301, the stack of mask-conformer blocks 300 does not perform any cross-attention because there is no first-pass transcription 120a to perform cross-attention upon. However, after executing the first pass 301, the first-pass transcription 120a is available to condition the stack of mask-conformer blocks 300, and thus, the stack of mask-conformer blocks 300 serves as a rescoring model during the second pass 302. More specifically, during the second pass 302, the stack of mask-conformer blocks 300 performs cross attention on the first-pass transcription 120a generated during the first pass 301.

Each mask-conformer block 300 in the stack of mask-conformer blocks 300 includes a stack of self-attention layers 310, a cross-attention layer 320, a convolution layer 330, and a mask-predict decoder 340. However, because the stack of mask-conformer blocks 300 does not perform cross-attention during the first pass 301, the cross-attention layer 320 may be disabled during the first pass 301. As such, the cross-attention layer 320 is not shown in FIG. 3A. In some implementations, each mask-conformer block 300 in the stack of mask-conformer blocks 300 shares a same mask-predict decoder 340 shared with each other mask-conformer block 300 in the stack of mask-conformer blocks 300. In other implementations, each mask-conformer block 300 in the stack of mask-conformer blocks 300 includes a respective mask-predict decoder 340 not shared with any of the other mask-conformer blocks 300 in the stack of mask-conformer blocks 300.

Referring now specifically to FIG. 3A, during the first pass 301, each mask-conformer block 300 includes the stack of self-attention layers 310, the convolution layer 330, and the mask-predict decoder 340. That is, during the first pass 301 the cross-attention layer 320 (FIG. 3B) is disabled. The stack of self-attention layers 310 is configured to receive, as input, the first-pass audio encodings 222 generated by an immediately preceding mask-conformer block 300 in the stack of mask-conformer blocks 300. Since there is no mask-conformer block 300 that precedes an initial mask-conformer block 300 in the stack of mask-conformer blocks 300, the initial mask-conformer block 300 is configured to receive and process the convolution output 212 generated by the one or more convolution subsampling layers 210 (FIG. 2) in lieu of the first pass audio encodings 222. The stack of self-attention layers 310 is configured to process the first-pass audio encodings 222 generated by the immediately preceding mask-conformer block 300 to generate a corresponding self-attention output 312. For example, a second mask-conformer block 300 receives the first pass-audio encodings 222 generated by a first mask-conformer block 300, a third mask-conformer block 300 receives the first-pass audio encodings 222 generated by the second mask-conformer block 300, and so on. The stack of self-attention layers 310 may include conformer or transformer layers. Thereafter, the mask-conformer block 300 uses a first concatenation operator 303 to generate a first concatenation 314 of the self-attention output 312 and the first-pass audio encodings 222.

The convolution layer 330 is configured to receive, as input, the first concatenation 314 and generate, as output, corresponding first-pass audio encodings 222 based on the first concatenation 314. As such, the corresponding first-pass audio encodings 222 are sent to the speech recognition decoder 230 and an immediately subsequent mask-conformer block 300 in the stack of mask-conformer blocks 300 (i.e., forward propagation). Thus, because the speech recognition decoder 230 is connected to an output of each mask-conformer block 300, the speech recognition decoder 230 generates the first-pass transcription 120a (FIG. 2) based on the first-pass audio encodings 222 generated by each mask-conformer block 300 and back-propagates the first-pass transcription 120a to the immediately subsequent mask-conformer block 300. For instance, the first mask-conformer block 300 generates corresponding first-pass audio encodings 222 which the speech recognition decoder 230 decodes to produce a corresponding first-pass transcription 120a that is back-propagated to the second mask-conformer block 300 (e.g., immediately subsequent mask-conformer block 300 with respect to the first mask-conformer block 300). Moreover, the mask-conformer block 300 uses a second concatenation operator 304 to generate a second concatenation 332 of the first-pass audio encodings 222 and the first concatenation 314.

The mask-predict decoder 340 is configured to generate a first-pass masked output sequence 344 by scoring each speech recognition token 122 of the sequence of speech recognition tokens 122 from the first-pass transcription 120a generated by the immediately preceding mask-conformer block 300. In particular, for each respective speech recognition token 122, the mask-predict decoder 340 determines a corresponding confidence value 342 representing a likelihood that the respective speech recognition token 122 from the first-pass transcription 120a is correct. Thereafter, the mask-predict decoder 340 determines whether the corresponding confidence value 342 satisfies a confidence values threshold. Based on determining that the corresponding confidence value 342 of a respective speech recognition token 122 fails to satisfy the confidence value threshold, the mask-predict decoder 340 replaces the respective speech recognition token 122 with a masked token. The masked token may represent a null value or blank value. On the other hand, based determining that the corresponding confidence value 342 of a respective speech recognition token 122 satisfies the confidence value threshold, the mask-predict decoder 340 outputs the respective speech recognition token 122 (e.g., the mask-predict decoder 340 determines to not replace the respective speech recognition token 122). The first-pass masked output sequence 344 is output to the stack of mask-conformer blocks 300 for processing during the second pass 302 (FIG. 3B). Accordingly, the first-pass masked output sequence 344 includes a partially masked output sequence. In some implementations, the mask-predict decoder 340 does not replace any of the speech recognition tokens 122 with the masked token. Instead, in these implementations, the mask-predict decoder 340 generates the first-pass masked output sequence 344 that includes the sequence of speech recognition tokens 122 and the corresponding confidence values 342.

Referring now specifically to FIG. 3B, during the second pass 302, each mask-conformer block 300 includes the stack of self-attention layers 310, the cross-attention layer 320, the convolution layer 330, and the mask-predict decoder 340. Notably, the cross-attention layer 320 is enabled during the second pass 302 in contrast to the first pass 301 (FIG. 3A). The stack of self-attention layers 310 is configured to receive, as input, the second-pass audio encodings 224 generated by an immediately preceding mask-conformer block 300 in the stack of mask-conformer blocks 300. Since there is no mask-conformer block 300 that precedes an initial mask-conformer block 300 in the stack of mask-conformer blocks 300, the initial mask-conformer block 300 is configured to receive and process the convolution output 212 generated by the one or more convolution subsampling layers 210 (FIG. 2) in lieu of the second-pass audio encodings 224. The stack of self-attention layers 310 is configured to process the second-pass audio encodings 224 generated by the immediately preceding mask-conformer block 300 to generate a corresponding self-attention output 312. Thereafter, the mask-conformer block 300 uses a third concatenation operator 306 to generate a third concatenation 316 of the self-attention output 312 and the second-pass audio encodings 224.

The cross-attention layer 320 is configured to receive, as input, the third concatenation 316 and the first-pass masked output sequence 344 and generate, as output, a corresponding cross-attention output 322. In some examples, the cross-attention layer 320 receives the first-pass masked output sequence 344 from an immediately preceding mask-conformer block 300. For instance, the second mask-conformer block 300 receives the first-pass masked output sequence 344 generated by the first mask-conformer block 300. In other examples, the cross-attention layer 320 receives the first-pass masked output sequence 344 from the same mask-conformer block 300. For instance, during the second pass 302, the second mask-conformer block 300 receives the first-pass masked output sequence 344 generated by the second mask-conformer block 300 during the first pass 301 (FIG. 3A). In some implementations, the cross-attention layer 320 receives a second-pass masked output sequence 346 from an immediately preceding mask-conformer block 300 in addition to, or in lieu of, the first-pass masked output sequence 344 (not shown). During the second pass 302, the cross-attention layer 320 is conditioned on the first-pass masked output sequence 344 whereby the conditioned cross-attention layer 320 generates the cross-attention output 322 based on the third concatenation 316. Moreover, the mask-conformer block 300 uses a fourth concatenation operator 308 to generate a fourth concatenation 324 of the cross-attention output 322 and the second-pass audio encodings 224.

The convolution layer 330 is configured to receive, as input, the fourth concatenation 324 and generate, as output, corresponding second-pass audio encodings 222 based on the fourth concatenation 324. As such, the corresponding second-pass audio encoding 224 is sent to the speech recognition decoder 230 and an immediately subsequent mask-conformer block 300 in the stack of mask-conformer blocks 300. Thus, because the output of each mask-conformer block 300 is connected the speech recognition decoder 230, the speech recognition decoder 230 generates the second-pass transcription 120b (FIG. 2) based on the second-pass audio encodings 224 generated by each mask-conformer block 300 and back-propagates the second-pass transcription 120b to the immediately subsequent mask-conformer block 300. For instance, the first mask-conformer block 300 generates a corresponding second-pass audio encoding 224 which the speech recognition decoder 230 decodes to produce a corresponding second-pass transcription 120b that is back-propagated to the second mask-conformer block 300 (e.g., immediately subsequent mask-conformer block 300 with respect to the first mask-conformer block 300). Moreover, the mask-conformer block 300 uses a fifth concatenation operator 309 to generate a fifth concatenation 334 of the second-pass audio encodings 224 and the fourth concatenation 324.

The mask-predict decoder 340 is configured to generate a second-pass masked output sequence 346 by scoring each speech recognition token 122 of the sequence of speech recognition tokens 122 from the second-pass transcription 120b generated by the immediately preceding mask-conformer block 300. In particular, for each respective speech recognition token 122, the mask-predict decoder 340 determines a corresponding confidence value 342 representing a likelihood that the respective speech recognition token 122 from the second-pass transcription 120b is correct. Thereafter, the mask-predict decoder 340 determines whether the corresponding confidence value 342 satisfies a confidence values threshold. Based on determining that the corresponding confidence value 342 of a respective speech recognition token 122 fails to satisfy the confidence value threshold, the mask-predict decoder 340 replaces the respective speech recognition token 122 with a masked token. The masked token may represent a null value or blank value. On the other hand, based determining that the corresponding confidence value 342 of a respective speech recognition token 122 satisfies the confidence value threshold, the mask-predict decoder 340 outputs the respective speech recognition token 122 (e.g., the mask-predict decoder 340 determines to not replace the respective speech recognition token 122). The second-pass masked output sequence 346 may be output to the next mask-conformer block 300 in the stack of mask-conformer blocks 300. Accordingly, the second-pass masked output sequence 346 includes a partially masked output sequence.

In some implementations, the mask-predict decoder 340 does not replace any of the speech recognition tokens 122 with the masked token. Instead, in these implementations, the mask-predict decoder 340 generates the second-pass masked output sequence 346 that includes the sequence of speech recognition tokens 122 and the corresponding confidence values 342.

In some implementations, the ASR model 200 is trained on a training dataset. The training dataset includes one or more training utterances each including a sequence of training speech recognition tokens. In some examples, a training process randomly replaces a first predetermined number of training speech recognition tokens with the masked token where the masked positions are sampled from a Bernoulli distribution. Moreover, the training process may replace a second predetermined number of training speech recognition tokens with random training speech recognition tokens. Here, the first predetermined number of training speech recognition tokens replaced with the masked token do not overlap with the second predetermined number of training speech recognition tokens replaced with a random token. By replacing the second predetermined number of training speech recognition tokens with a random training speech recognition token, the training process simulates the possibility of unmasked incorrect tokens during the two-pass speech recognition process. That is, in some scenarios, the mask-predict decoder 340 fails to replace a respective one of the speech recognition tokens 122 that is incorrect with the masked token. As such, the second-pass transcription 120b may correct incorrect speech recognition tokens 122 that were not masked in addition to speech recognition tokens 122 that were masked during the first pass 301.

FIG. 4 illustrates an example two-pass decoding process 400 of the ASR model 200. The ASR model 200 receives, as input, an input sequence ($O=o_t \epsilon \mathbb{R}^F|t=1,T'$) and generates, as output, a transcription 120 ($W=w_n \epsilon V|n=1, \ldots, N$). Here, T' represents a length of the input sequence (e.g., sequence of acoustic frames 110), N represents a length of the transcription 120, $o_t$ represents an F-dimensional acoustic frame at frame t, $w_n$ is an output token (e.g., speech recognition token 122) at position n, and V represents a vocabulary. The process 400 performs operations 402-406 during the first-pass 301 (FIG. 3A) of the two-pass decoding process 400. At operation 402, the process 400 uses the stack of mask-conformer blocks 300 to generate a first-pass audio encoding ($H_{cfm}$) 222 based on the sequence of acoustic frames 110. At operation 404, the process 400 uses the decoder 230 to decode the first-pass audio encoding 222 to generate a corresponding first-pass transcription ($\hat{W}$) 120a according to a beam size K. At operation 406, the process 400 uses the mask-predict decoder 340 to determine a confidence value 342 for each respective speech recognition token ($\hat{w}_n$) 122 from the first-pass transcription 120a. Moreover, the mask-predict decoder 340 determines whether each confidence value 342 satisfies a confidence value threshold ($P_{thres}$). When the confidence value 342 fails to satisfy the confidence value threshold, the mask-predict decoder 340 replaces the corresponding speech recognition token 122 with a masked token. Otherwise, the mask-predict decoder 340 determines to not replace the speech recognition token 122. As a result, the mask-predict decoder 340 outputs the first-pass masked output sequence 344. The process 400 performs operations 408 and 410 during the second-pass 302 (FIG. 3B). In particular, at operation 408, the process 400 includes generating second-pass audio encodings ($H_{cfm-ca}$) 224 based on the sequence of acoustic frames 110 and the first-pass masked output sequence 344 generated during the first-pass 301. Finally, at operation 410, the process 400 includes using the decoder 230 to decode the second-pass audio encodings 224 to generate a corresponding second-pass transcription 120b.

For example, the ASR model 200 may receive a respective sequence of acoustic frames 110 for an utterance 106 of "it is cold today" and generate a first-pass transcription 120a of "it his cold today" from a corresponding first-pass audio encoding 222. Notably, the first-pass transcription 120a includes the incorrect term of "his" instead of "is." Thereafter, the mask-predict decoder 340 may determine a confidence value 342 for each respective speech recognition token 122 from the first-pass transcription 120a. In this example, the mask-predict decoder 340 determines that the confidence value 342 for the speech recognition token 122 of "his" fails to satisfy the confidence value threshold and replace the speech recognition token 122 of "his" with a masked token (e.g., [MASK]). As a result, the mask-predict decoder 340 generates the first-pass masked output sequence 344 of "it [MASK] cold today". During the second-pass 302, the stack of mask-conformer blocks 300 is conditioned on the first-pass masked output sequence 344 and a corresponding second-pass audio encoding which is decoded by the speech recognition decoder 230 to generate the second-pass transcription 120b of "it is cold today."

Figure 5:
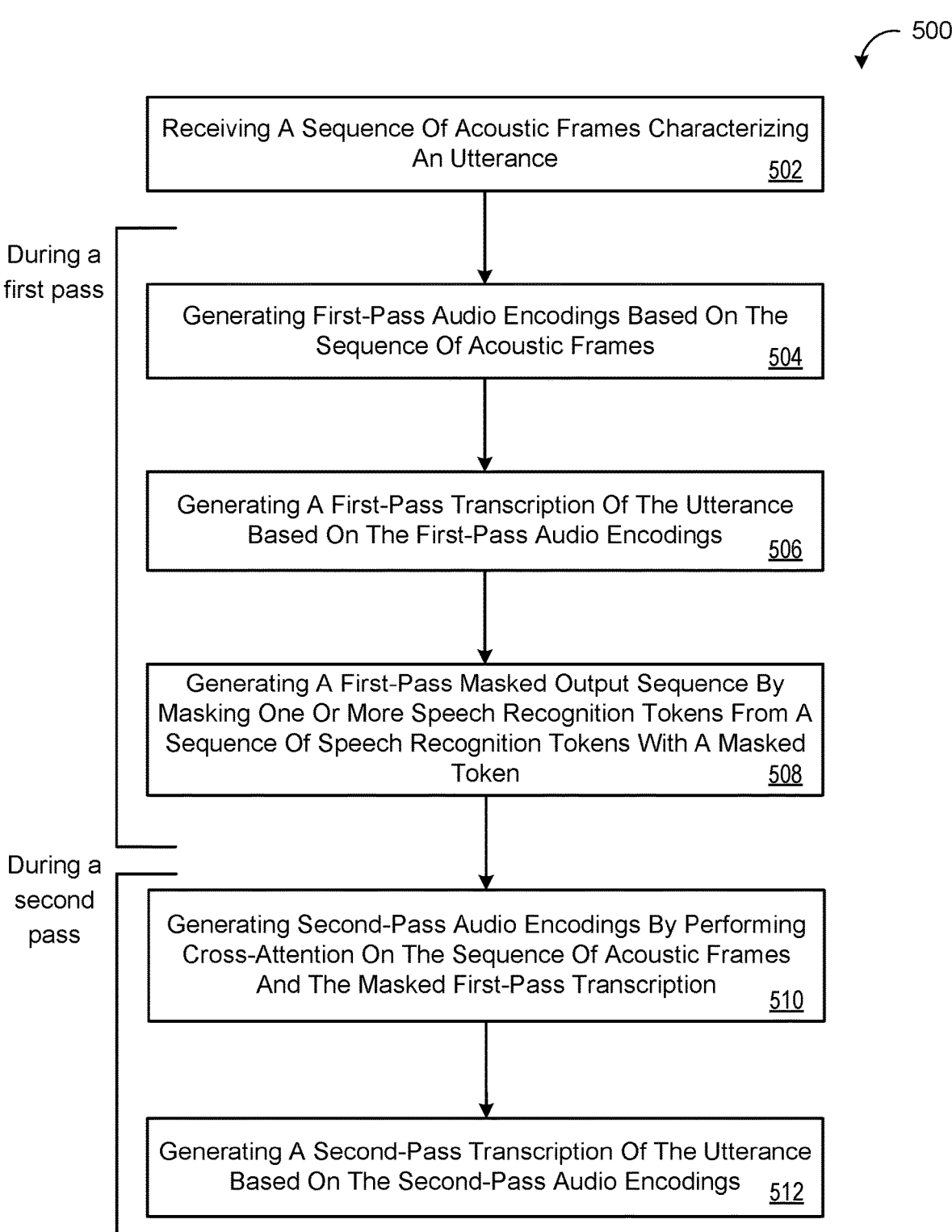
FIG. 5 is a flowchart of an example arrangement of operations for a computer-implemented method of performing speech recognition using an acoustic encoder that has a stack of mask-conformer blocks.
Figure 6:
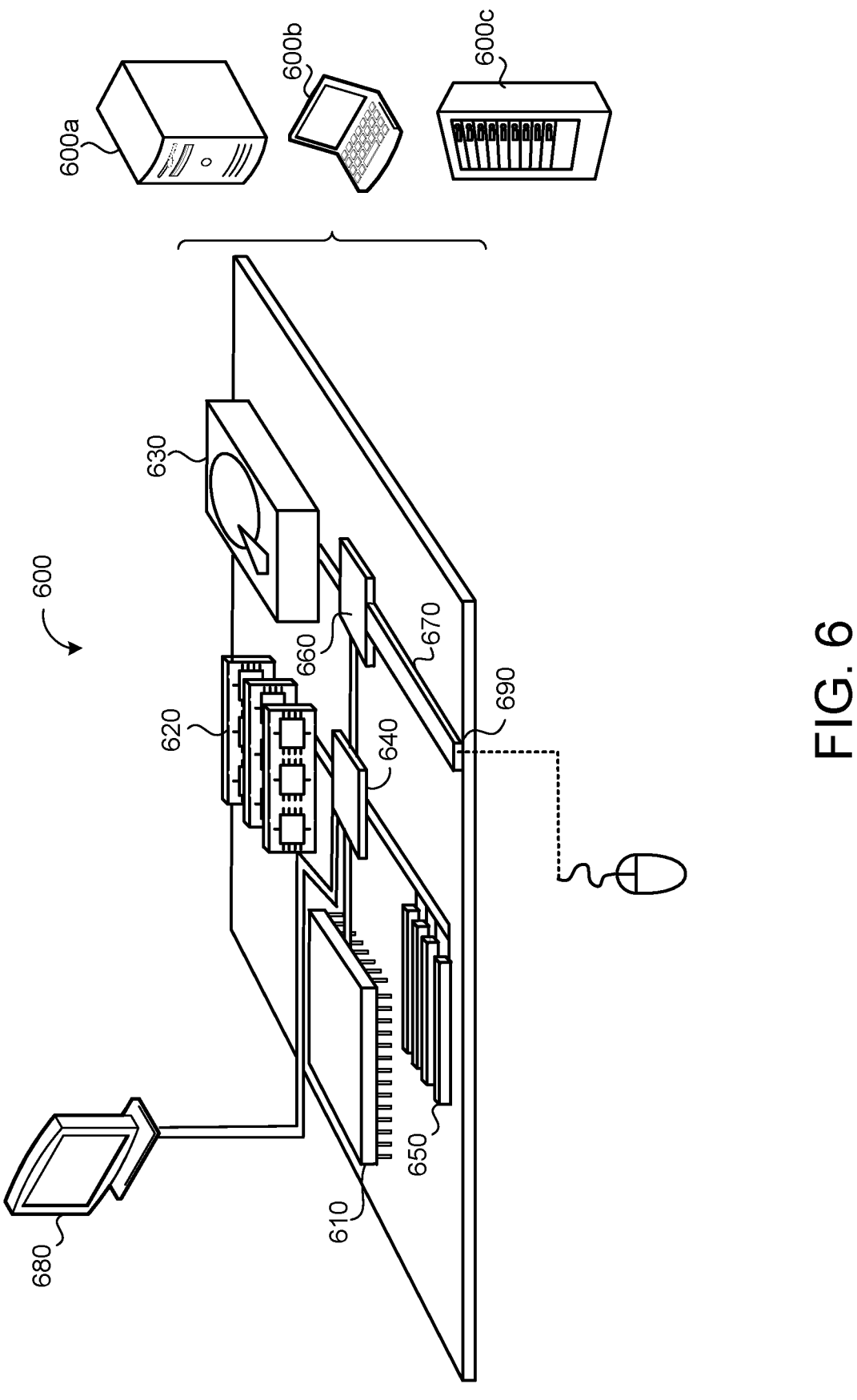
FIG. 6 is a schematic view of an example computing device that may be used to implement the systems and methods described herein.

FIG. 5 is a flowchart of an exemplary arrangement of operations for a computer-implemented method 500 of performing speech recognition using an acoustic encoder that has a stack of mask-conformer blocks. The method may execute on data processing hardware 610 (FIG. 6) using instructions stored on memory hardware 620 (FIG. 6). The data processing hardware 610 and the memory hardware 620 may reside on the user device 102 and/or the remote computing device 201 of FIG. 1 each corresponding to the computing device 600 (FIG. 6).

At operation 502, the method 500 includes receiving a sequence of acoustic frames 110 characterizing an utterance 106. During a first pass 301, the method 500 performs operations 504-508. At operation 504, the method 500 includes generating, using a stack of mask-conformer blocks 300 of an acoustic encoder 220, first-pass audio encodings 222 based on the sequence of acoustic frames 110. In some examples, the stack of mask-conformer blocks 300 generates the first-pass audio encodings 222 based on a convolution output 212 in addition to, or in lieu of, the sequence of acoustic frames 110. At operation 506, the method 500 includes generating, using a speech recognition decoder 230, a first-pass transcription 120a of the utterance 106 based on the first-pass audio encodings 222. The first-pass transcription 120a includes a sequence of speech recognition tokens 122 such as words, wordpieces, graphemes, etc. At operation 508, the method 500 includes generating, using a mask-predict decoder 340 of the acoustic encoder 220, a first-pass masked output sequence 344 by masking one or more of the speech recognition tokens 122 from the sequence of speech recognition tokens 122 with a masked token.

The method 500 performs operations 510 and 512 during a second pass 302. At operation 510, the method 500 includes generating, using the stack of mask-conformer blocks 300 of the acoustic encoder 220, second-pass audio encodings 224 by performing cross-attention on the sequence of acoustic frames 110 and the first-pass masked output sequence 344 generated during the first pass 301. At operation 512, the method 500 includes generating, using the speech recognition decoder 230, a second-pass transcription 120b of the utterance 106 based on the second-pass audio encodings 224.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

receiving a sequence of acoustic frames characterizing an utterance;

during a first pass:

generating, as output from each mask-conformer block in using a stack of mask-conformer blocks of an acoustic encoder, first-pass audio encodings based on the sequence of acoustic frames;

generating, using a speech recognition decoder, a first-pass transcription of the utterance based on the first-pass audio encodings generated as output from each mask-conformer block, the first-pass transcription comprising a sequence of speech recognition tokens; and generating, using a mask-predict decoder of the acoustic encoder, a first-pass masked output sequence by scoring each speech recognition token from the sequence of speech recognition tokens of the first-pass transcription generated based on the first-pass audio encodings output from an immediately preceding mask-conformer block in the stack of mask-conformer blocks, and masking one or more of the speech recognition tokens from the sequence of speech recognition tokens with a masked token; and during a second pass:

generating, using the stack of mask-conformer blocks of the acoustic encoder, second-pass audio encodings by performing cross-attention on the sequence of acoustic frames and the first-pass masked output sequence, wherein each mask-conformer block in the stack of mask-conformer blocks comprises a cross-attention layer that is disabled during the first pass and enabled during the second pass; and generating, using the speech recognition decoder, a second-pass transcription of the utterance based on the second-pass audio encodings.

2. The computer-implemented method of claim 1, wherein the operations further comprise:

generating, using one or more convolution subsampling layers, a convolution output based on the sequence of acoustic frames, wherein generating the first-pass audio encodings is further based on the convolution output.

3. The computer-implemented method of claim 1, wherein the speech recognition decoder comprises one of a Connectionist Temporal Classification (CTC) decoder, a listen-attend-spell decoder, a Recurrent Neural Network-Transducer (RNN-T) decoder, a hybrid autoregressive transducer (HAT) decoder, a Globally Normalized Autoregressive Transducer (GNAT) decoder, or a mask-predict decoder.

4. The computer-implemented method of claim 1, wherein the speech recognition decoder is connected to an output of each mask-conformer block in the stack of mask-conformer blocks.

5. The computer-implemented method of claim 1, wherein each mask-conformer block in the stack of mask-conformer blocks comprises at least one of:

a stack of self-attention layers;

a cross-attention layer;

a convolution layer; or a mask-predict decoder.

6. The computer-implemented method of claim 1, wherein each mask-conformer block in the stack of mask-conformer blocks comprises a respective mask-predict decoder not shared with any of the other mask-conformer blocks in the stack of mask-conformer blocks.

7. The computer-implemented method of claim 1, wherein each mask-conformer block in the stack of mask-conformer blocks comprises a same mask-predict decoder shared with each other mask-conformer block in the stack of mask-conformer blocks.

8. The computer-implemented method of claim 1, wherein generating the first-pass masked output sequence comprises, for each respective speech recognition token from the sequence of speech recognition tokens, determining a confidence value indicating a likelihood that the respective speech recognition token is correct.

9. The computer-implemented method of claim 8, wherein the operations further comprise:

determining that the confidence value for a respective one of the speech recognition tokens satisfies a confidence value threshold; and based on determining that the confidence value for the respective one of the speech recognition tokens satisfies the confidence value threshold, replacing the respective one of the speech recognition tokens with the masked token.

10. A system comprising:

data processing hardware; and memory hardware in communication with the data processing hardware, the memory hardware storing instructions that when executed on the data processing hardware cause the data processing hardware to perform operations comprising:

receiving a sequence of acoustic frames characterizing an utterance;

during a first pass:

generating, as output from each mask-conformer block in using a stack of mask-conformer blocks of an acoustic encoder, first-pass audio encodings based on the sequence of acoustic frames;

generating, using a speech recognition decoder, a first-pass transcription of the utterance based on the first-pass audio encodings generated as output from each mask-conformer block, the first-pass transcription comprising a sequence of speech recognition tokens; and generating, using a mask-predict decoder of the acoustic encoder, a first-pass masked output sequence by scoring each speech recognition token from the sequence of speech recognition tokens of the first-pass transcription generated based on the first-pass audio encodings output from an immediately preceding mask-conformer block in the stack of mask-conformer blocks, and masking one or more of the speech recognition tokens from the sequence of speech recognition tokens with a masked token; and during a second pass:

generating, using the stack of mask-conformer blocks of the acoustic encoder, second-pass audio encodings by performing cross-attention on the sequence of acoustic frames and the first-pass masked output sequence, wherein each mask-conformer block in the stack of mask-conformer blocks comprises a cross-attention layer that is disabled during the first pass and enabled during the second pass; and generating, using the speech recognition decoder, a second-pass transcription of the utterance based on the second-pass audio encodings.

11. The system of claim 10, wherein the operations further comprise:

generating, using one or more convolution subsampling layers, a convolution output based on the sequence of acoustic frames, wherein generating the first-pass audio encodings is further based on the convolution output.

12. The system of claim 10, wherein the speech recognition decoder comprises one of a Connectionist Temporal Classification (CTC) decoder, a listen-attend-spell decoder, a Recurrent Neural Network-Transducer (RNN-T) decoder, a hybrid autoregressive transducer (HAT) decoder, a Globally Normalized Autoregressive Transducer (GNAT) decoder, or a mask-predict decoder.

13. The system of claim 10, wherein the speech recognition decoder is connected to an output of each mask-conformer block in the stack of mask-conformer blocks.

14. The system of claim 10, wherein each mask-conformer block in the stack of mask-conformer blocks comprises at least one of:

a stack of self-attention layers;

a cross-attention layer;

a convolution layer; or a mask-predict decoder.

15. The system of claim 10, wherein each mask-conformer block in the stack of mask-conformer blocks comprises a respective mask-predict decoder not shared with any of the other mask-conformer blocks in the stack of mask-conformer blocks.

16. The system of claim 10, wherein each mask-conformer block in the stack of mask-conformer blocks comprises a same mask-predict decoder shared with each other mask-conformer block in the stack of mask-conformer blocks.

17. The system of claim 10, wherein generating the first-pass masked output sequence comprises, for each respective speech recognition token from the sequence of speech recognition tokens, determining a confidence value indicating a likelihood that the respective speech recognition token is correct.

18. The system of claim 17, wherein the operations further comprise:

determining that the confidence value for a respective one of the speech recognition tokens satisfies a confidence value threshold; and based on determining that the confidence value for the respective one of the speech recognition tokens satisfies the confidence value threshold, replacing the respective one of the speech recognition tokens with the masked token.

* * * * *